May 12, 1936.    G. G. GUTHRIE    2,040,375
PRESSURE ALARM
Filed Jan. 14, 1935    2 Sheets-Sheet 1

GEORGE G. GUTHRIE,
INVENTOR.

BY Charles R. Burke
ATTORNEYS.

May 12, 1936.　　G. G. GUTHRIE　　2,040,375
PRESSURE ALARM
Filed Jan. 14, 1935　　2 Sheets-Sheet 2

GEORGE G. GUTHRIE,
INVENTOR.

BY Charles R. Burke
ATTORNEY.

Patented May 12, 1936

2,040,375

UNITED STATES PATENT OFFICE 2,040,375

PRESSURE ALARM

George G. Guthrie, Tulsa, Okla.

Application January 14, 1935, Serial No. 1,715

4 Claims. (Cl. 177—311)

My invention consists in new and useful improvements in a tire pressure alarm system for automobiles and other vehicles equipped with pneumatic tires, and relates to that type of device wherein tire pressure actuates a wheel-carried contact for completing an electric alarm circuit.

It is the object of my invention to provide a new and improved construction which is readily adaptable to any vehicle wheel without necessitating alterations in the wheel structure, and one which can be made of a minimum weight and at a reasonable cost of manufacture.

A further object of my invention is to provide a system of this character including a set of wheel-carried magnetic coils and an opposing set of stationary magnetic coils carried at a suitable point on the vehicle, whereby, through a suitable pressure responsive switch on the vehicle wheel, electrical impulses are created and transmitted to a suitable alarm device located in the vehicle. With a system of this type, the operator of the vehicle is informed at all times of the pressure conditions of all of the vehicle wheels.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a diagrammatic view of my entire system.

Figure 1:
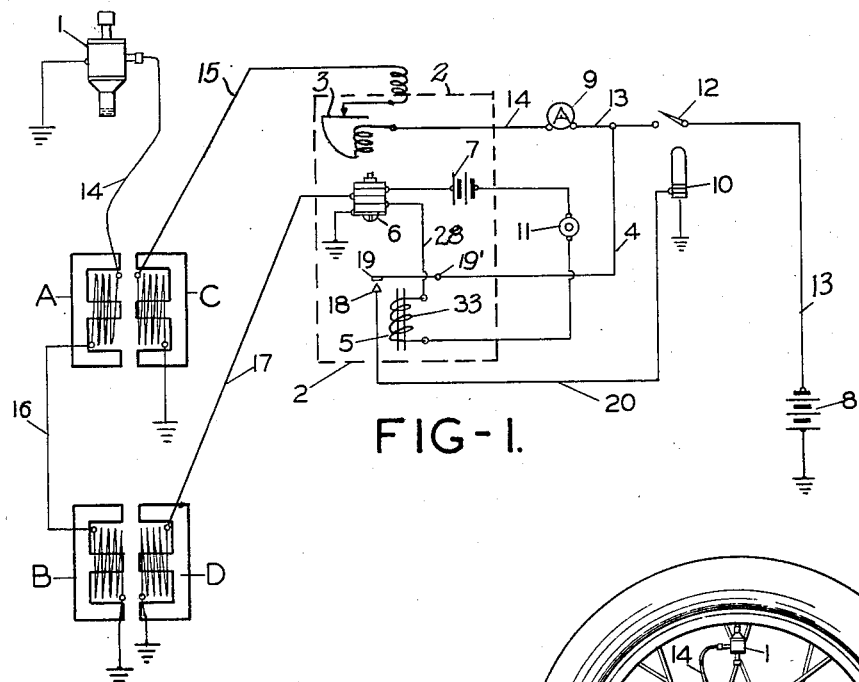
Figure 4:
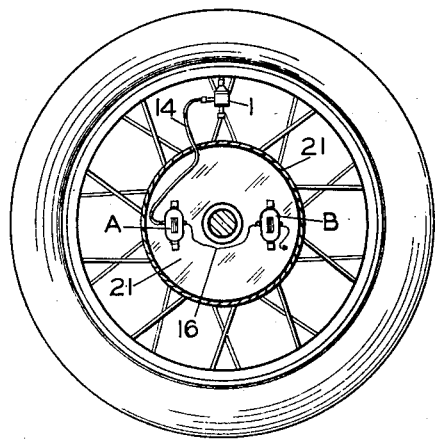
Fig. 4 is an assembly view of the wheel taken from the rear on line E—E of Fig. 5.
Figure 5:
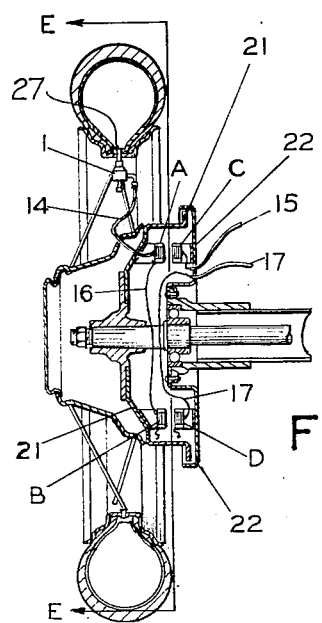
Fig. 5 is a complete sectional view through the wheel and brake drum.
Figure 2:
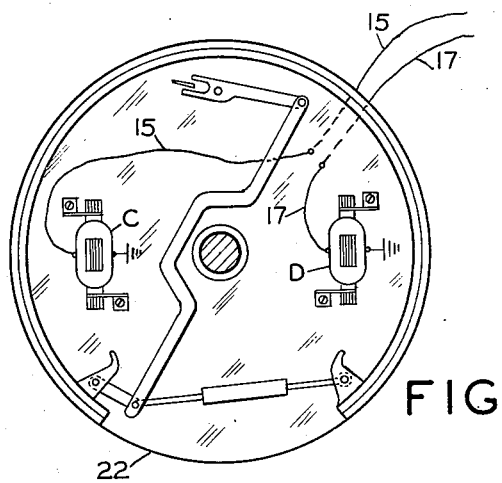
Fig. 2 is a plan view of the brake flange plate showing the stationary coils in place.
Figure 3:
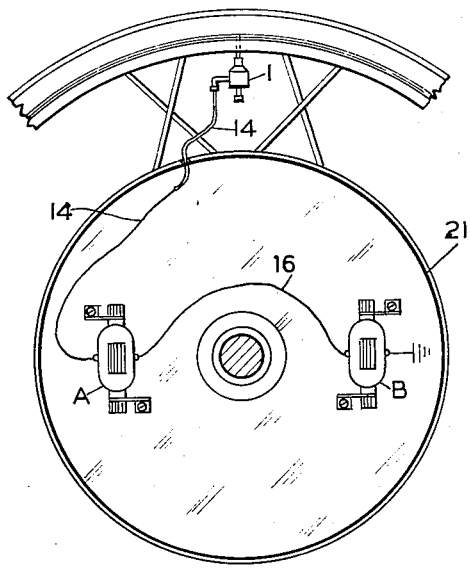
Fig. 3 is a similar view of the brake drum showing the wheel-carried coils in place.

In the drawings, A and B represent magnetically energized coils mounted on the brake drum 21 of a vehicle wheel and adapted to rotate with the wheel. C and D represent a corresponding pair of opposing magnetically energized coils mounted on an axle-carried stationary plate 22. The wheel-carried coils A and B are connected in series circuit with a pressure responsive switch 1 connected to the air valve 27 of the vehicle tire by means of wires 14 and 16 as will be seen from Fig. 1. The coil C is connected by wire 15 to an electromagnetic vibrator 3 which in turn is connected by wire 14 to an ammeter 9. The ammeter 9 is connected by wire 13 to a car battery 8 with ignition switch 12 interposed in the line 13.

Coil D is connected by wire 17 to a rectifying relay assembly 2 comprising a rectifier 6, battery 7, switch 11 of the type which is normally in closed position and is opened by a push-button, and coil 33 of a relay 5, said relay being connected by wire 28 to the rectifier 6. A signal light 10 or other suitable alarm device is connected by wire 20 to armature points 18 and 19, said armature being connected by wire 4 to the wire 13 leading from the ammeter 9 to the car battery 8. The armature 19 is preferably pivoted at 19' for the purpose hereinafter set forth.

Figure 6:
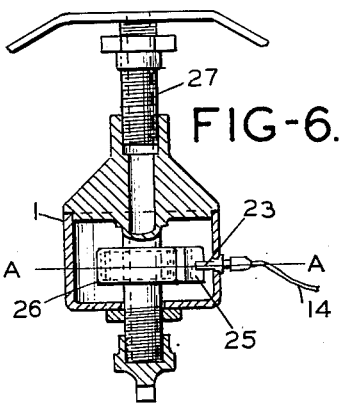
Fig. 6 is a sectional view taken on line B—B of Fig. 7 showing the pressure switch.
Figure 7:
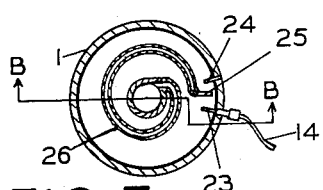
Fig. 7 is a sectional view of said switch taken on line A—A of Fig. 6.

The pressure responsive switch 1, as will be seen from Figs. 6 and 7, is mounted on the stem 27 of the vehicle tire valve and comprises a substantially cylindrical hollow body portion in which is mounted a Bourdon tube or the like 26 which is in pressure communication with the inner tube 25 at one end and carries a contact 25 at its free end. The switch casing 1 carries two fixed contacts 23 and 24 spaced peripherally from one another, the movable switch 24 on the pressure tube 26 lying between said fixed contacts and normally out of engagement with either. The fixed contacts 23 and 24, through the metallic casing 1 and wire 14, are connected to coil A as hereinbefore stated.

In operation, when the ignition switch 12 is closed, current flows from battery 8 continuously through lines 13 and 14, through ammeter 9 and vibrator 3, from vibrator 3 through line 15 to coil C on the brake flange plate 22, thus energizing coil C.

Under normal conditions when the tire is at the proper predetermined pressure, the pressure responsive switch 1 remains open, but upon a drop in pressure below a predetermined point, the contact 25 on the pressure responsive tube 26 engages the stationary contact 23, closing the circuit and causing current to be induced into coil A by the current in coil C, as the wheel rotates. Current then flows from the coil A through wire 16 to coil B. The current in coil B is induced into coil D from which current flows by means of line 17 through rectifier 6, and from there through the dry cell battery 7, push-button switch 11, to relay coil 33 and back to the rectifier 6 through line 28.

While current is flowing from coil D, as before stated, contacts 18 and 19 of the armature are closed and current flows from battery 8 through line 4, through said contacts 18 and 19 and from there through line 20 to the signal light 10, causing the latter to be energized.

It may be stated that the rectifier 6 is preferably of the copper oxidized disc type, its function being to change the A. C. impulses from the coil D to D. C. impulses through the relay assembly 2, and also to increase the voltage in the relay coil 33 to magnetically attract the pivoted armature 18 and bring it into contact with relay point 18 to close the circuit to the signal device 10.

The current from the battery 7 is not sufficient to close the points 18 and 19 of the relay, but after they have been closed, by increasing the voltage as just described, said battery 7 is sufficient to retain said points in closed position. This circuit remains closed until broken by the push-button switch 11.

Thus in the present invention, I have provided a device wherein upon operation of the pressure responsive switch 1 by a reduction in pressure in the tire, the circuit to coils A and B is completed which causes an induction of current from coil C into coil A, and from coil B into coil D, which in turn, through the medium of rectifier 6, changes the A. C. impulses from the coil D to D. C. impulses and supplements the voltage of battery 7 to instantaneously close contact points 18 and 19. As before stated, the battery 7 is sufficient to hold these contact points closed and to cause a steady energization of the signal means 10.

From the foregoing it is believed that my invention may be readily understood by those skilled in the art without further description, it being borne in mind that numerous changes may be made in the details disclosed without departing from the spirit of the invention as set out in the following claims.

What I claim and desire to secure by Letters Patent is:—

1. A tire pressure alarm system for vehicles comprising at least a pair of coils mounted on a wheel of the vehicle, a tire pressure responsive switch mounted on said wheel, means for connecting said switch and coils in series circuit, at least a pair of opposing coils mounted on a stationary portion of the vehicle adjacent the first mentioned coils, an electro-magnetic interrupter, a source of current, and means for connecting said interrupter, current source and one of said opposing coils in series, an electric signal means, and means controlled by the current in the remaining opposing coils for energizing said signal means.

2. A system as claimed in claim 1 wherein the coils of the opposing pairs are arranged in diametrically opposite relation.

3. A tire pressure alarm system for vehicles comprising at least a pair of coils mounted on a wheel of the vehicle, a tire pressure responsive switch mounted on said wheel, means for connecting said switch and coils in series circuit, at least a pair of opposing coils mounted on a stationary portion of the vehicle adjacent the first mentioned coils, an electro-magnetic interrupter, a source of current, means for connecting said interrupter, current source and one of said opposing coils in series, and signal means controlled by the current in the remaining opposing coils.

4. A tire pressure alarm system for vehicles comprising at least a pair of coils mounted on a wheel of the vehicle, a tire pressure responsive switch mounted on said wheel, means for connecting said switch and coils in series circuit, at least a pair of opposing coils mounted on a stationary portion of the vehicle adjacent the first mentioned coils, an electro-magnetic interrupter, a source of current, means for connecting said interrupter, current source and one of said opposing coils in series, and means controlled by an impulse of current in the remaining opposing coils for causing prolonged energization of said signal means.

GEORGE G. GUTHRIE.